US011377830B2

(12) United States Patent
Davis

(10) Patent No.: US 11,377,830 B2
(45) Date of Patent: Jul. 5, 2022

(54) FAUCET CONTROL SYSTEM

(71) Applicant: Erica Davis, Clearwater, FL (US)

(72) Inventor: Erica Davis, Clearwater, FL (US)

(*) Notice: Subject to any disclaimer, the term of this patent is extended or adjusted under 35 U.S.C. 154(b) by 0 days.

(21) Appl. No.: 16/432,054

(22) Filed: Jun. 5, 2019

(65) Prior Publication Data

US 2020/0199856 A1  Jun. 25, 2020

Related U.S. Application Data

(60) Provisional application No. 62/783,344, filed on Dec. 21, 2018.

(51) Int. Cl.
| | | |
|---|---|---|
| *E03C 1/05* | (2006.01) | |
| *F16K 11/078* | (2006.01) | |
| *F16K 37/00* | (2006.01) | |
| *F16K 11/00* | (2006.01) | |
| *G05D 7/06* | (2006.01) | |

(52) U.S. Cl.
CPC ............ *E03C 1/057* (2013.01); *F16K 11/078* (2013.01); *F16K 19/006* (2013.01); *F16K 37/0041* (2013.01); *G05D 7/0635* (2013.01)

(58) Field of Classification Search
CPC ...... E03C 1/057; G05D 7/0635; F16K 11/078
USPC ................................................ 239/70; 4/623
See application file for complete search history.

(56) References Cited

U.S. PATENT DOCUMENTS

| | | | |
|---|---|---|---|
| 6,491,062 B1 | 12/2002 | Croft | |
| 7,819,136 B1* | 10/2010 | Eddy | G01F 11/00 137/624.11 |
| 9,032,998 B2* | 5/2015 | O'Brien | A01G 25/16 137/487.5 |
| 9,074,698 B2 | 7/2015 | Esche et al. | |
| 2004/0262552 A1 | 12/2004 | Lowe | |
| 2005/0211792 A1* | 9/2005 | Clark et al. | A01G 25/167 239/67 |
| 2010/0200789 A1 | 8/2010 | Connors | |
| 2013/0086741 A1* | 4/2013 | Bayley et al. | A47K 10/48 4/623 |
| 2014/0326321 A1* | 11/2014 | Sawaski et al. | E03C 1/057 137/1 |
| 2017/0218606 A1* | 8/2017 | Wang et al. | E03C 1/055 |
| 2018/0148912 A1* | 5/2018 | Park | F16K 37/005 |
| 2019/0373152 A1* | 12/2019 | Tan et al. | G03B 9/08 |

* cited by examiner

*Primary Examiner* — Kevin L Lee
(74) *Attorney, Agent, or Firm* — Boudwin Intellectual Property; Daniel Boudwin

(57) ABSTRACT

A faucet control system. The faucet control system includes a faucet with a first valve, a second valve, and a mobile application configured to control the second valve. The first valve may be manually controlled, and the second valve may be automatically or programmatically controlled. The second valve may be activated at a specific time. A software application on a mobile device is operably connected to the second valve, such that the application specifies the specific time the valve turns on or off. The faucet is programable to turn the water on, off, or a combination of the two as a user desires.

11 Claims, 5 Drawing Sheets

FAUCET CONTROL SYSTEM

CROSS REFERENCE TO RELATED APPLICATIONS

This application claims the benefit of U.S. Provisional Application No. 62/783,344 filed on Dec. 21, 2018. The above identified patent application is herein incorporated by reference in its entirety to provide continuity of disclosure.

BACKGROUND OF THE INVENTION

The present invention relates to controlling water faucets. More particularly, the present invention provides a faucet control system which includes a faucet with a first valve, a second valve and a mobile application (e.g., software on a mobile device with wireless functionality). The first valve may be a manually controlled valve, and the second valve may be an automated valve. The second valve may be activated at a specific time. The mobile application on the mobile device is operably connected to the second valve, such that the mobile application specifies the specific time at which the valve turns on or off.

Many people use water in their everyday activities. Some of these activities include brushing one's teeth, doing dishes, or taking a shower or bath. Many of these people leave the water on for extended periods of time during these activities. Water is wasted when it is allowed to run for an extended period of time without being used. In addition, a person's water bill can be higher due to excess running water. Individuals may also want a way to wake up to a hot bath without having to get up early to have to fill the tub.

Consequently, there is a need for an improvement in the art of controlling faucets. The present invention substantially diverges in design elements from the known art while at the same time solves a problem many people face when using faucets. In this regard the present invention substantially fulfills these unmet needs.

SUMMARY OF THE INVENTION

The present invention provides a faucet control system, wherein the same can be utilized for providing convenience to a user when turning faucets on or off. The faucet control system comprises a faucet with a first valve, a second valve, and a mobile application for use with a mobile device. The first valve may be a manually controlled valve, and the second valve may be an automated valve. The second valve may be activated at a specific time. A software application on a mobile device is operably connected to the second valve, such that the application specifies the specific time at which the valve turns on or off.

Another object of the present invention is a method for controlling a faucet. The method includes setting a timer on a mobile application, turning on a faucet, starting the countdown of the timer, and turning the faucet off once the timer expires.

Another object of the present invention is a method for controlling a faucet. The method includes activating a plurality of timing lights.

Another object of the present invention is a method for controlling a faucet. The method includes setting an alarm, wherein the alarm will turn the faucet on.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself, and manner in which it may be made and used, may be better understood after a review of the following description, taken in connection with the accompanying drawings, wherein like numeral annotations are provided throughout.

DETAILED DESCRIPTION OF THE INVENTION

Figure 1:
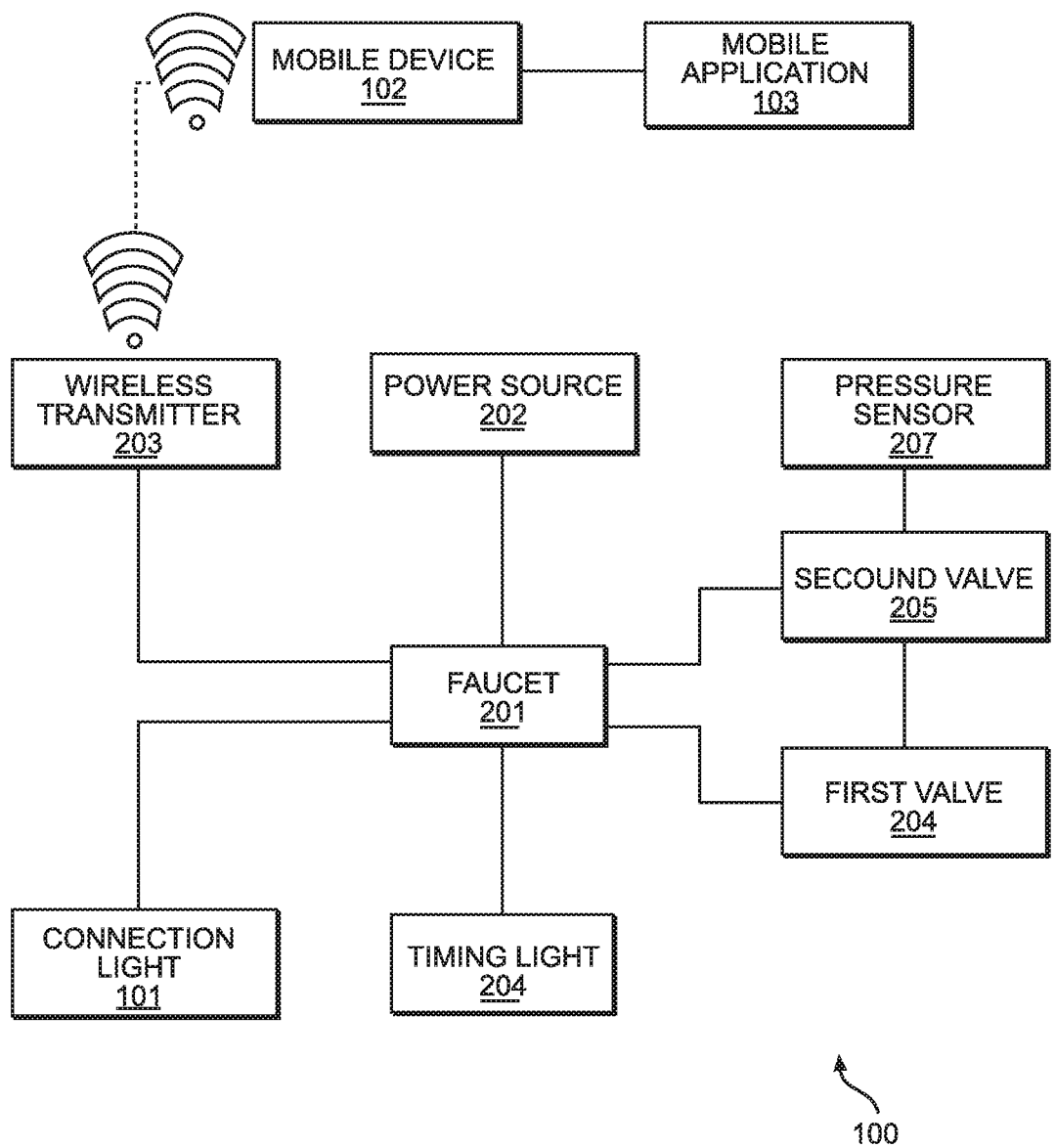
FIG. 1 shows a diagram of an embodiment of the wiring and connections for the faucet control system.

Reference is made herein to the attached drawings. Like reference numerals are used throughout the drawings to depict like or similar elements of the water faucet control system. For the purpose of presenting a brief and clear description of the present invention, a preferred embodiment will be discussed as used for the faucet control system. The figures are intended for representative purposes only and should not be considered to be limiting in any respect.

Referring now to FIG. 1, there is shown a diagram of an embodiment of the wiring and connections for the faucet control system. The faucet control system 100 includes a faucet 201. The faucet control system 100 is meant to work with any standard faucet. This means that the system can be added to existing faucets. In other embodiments the faucets are special faucets. In these embodiments, the faucet 201 is connected to a power source 202. The faucet further includes a first valve 204 and a second valve 205. The first valve 204 is a standard valve that will allow water to flow when open and prevent water flow when closed. The second valve 205 is an electrically controlled valve that is connected to the power source 202. In one embodiment, the second valve 205 includes a pressure sensor 207 to detect water flow.

The faucet control system 100 further has a plurality of lights thereon. In one embodiment, there is plurality of timing lights 2011 disposed thereon. The timing lights will be detailed in the description of FIG. 3. In one embodiment, the plurality of lights further includes a connection light 101. The connection light 101 will be detailed further in FIG. 2. The connection light 101 and the faucet are also operably connected to a wireless transceiver 203. The wireless transceiver 203 is capable of making connections via WIFI. The wireless transceiver 203 is configured to connect to a mobile device 103. The mobile device 103 further runs a mobile application 206 that is in communication with the faucet via the wireless transceiver 203.

Figure 2:
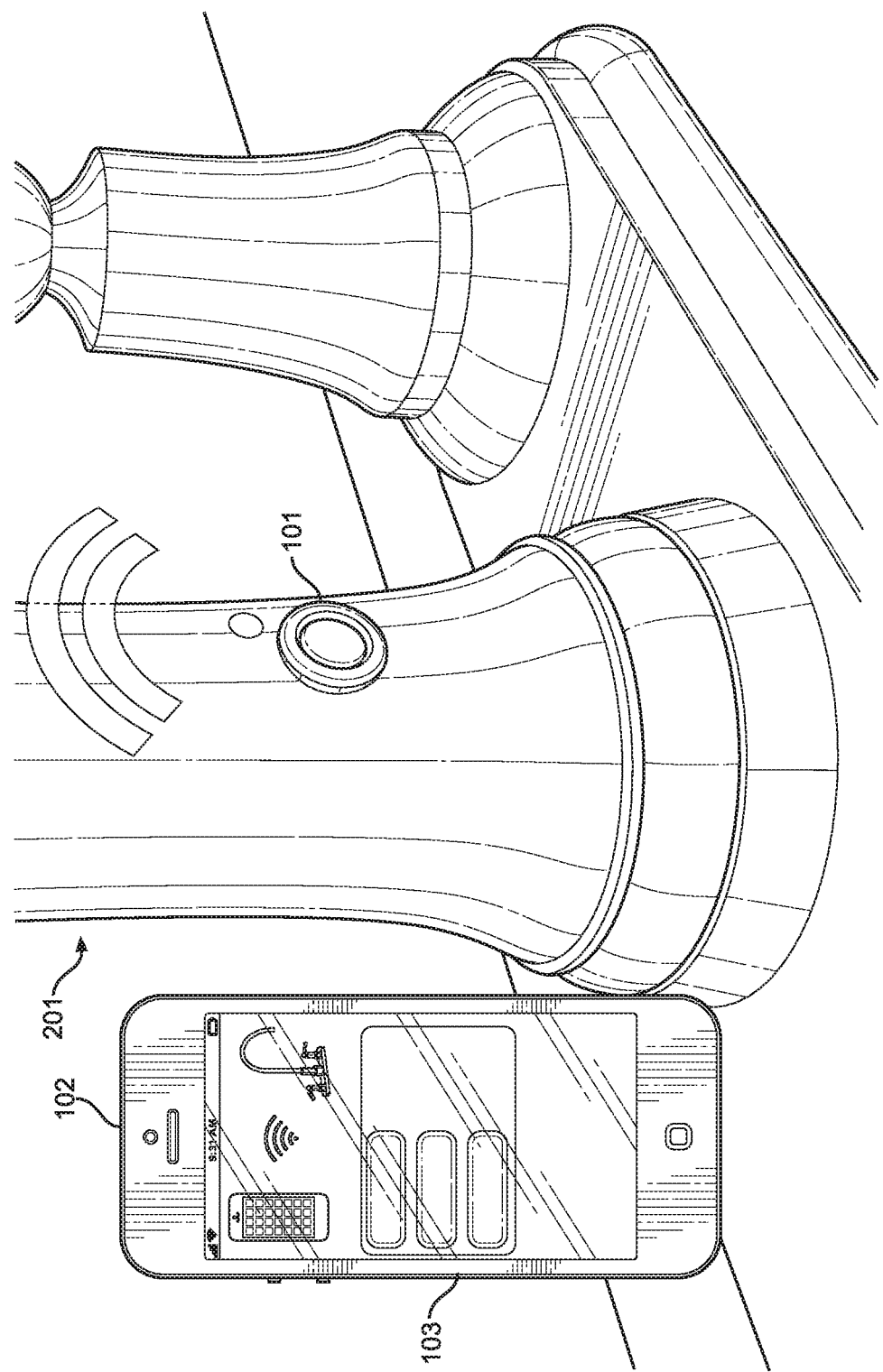
FIG. 2 shows an embodiment of the faucet control system application connected to a faucet.

Referring now to FIG. 2, there is shown an embodiment of the faucet control system application connected to a faucet. In one embodiment, the connection light 101 is located by the base of the faucet 201. The connection light 101 will illuminate when the mobile application 103 is connected to the faucet 201. The mobile application will have the ability to connect to a series of faucets. This will allow a single mobile application on a single mobile device to control multiple faucets. The connection light 101 will help a user ensure the correct faucet is being controlled.

The mobile application 103 may include several different features, or a combination of the features. The mobile application has the ability to track time and is able to sync to the local time as well. In one embodiment, the mobile application 103 has the ability to control the amount of time a faucet runs before the faucet is turned off. In one embodiment the mobile application 103 can control the timing lights 2011 that will be discussed in the description of FIG. 3. In one embodiment, the mobile application 103 can turn the faucet 201 on at a predetermined time. In one embodiment, the mobile application, 103 can turn a faucet 201 on then after a timer is expired the faucet 201 can be turned off again.

Figure 3:
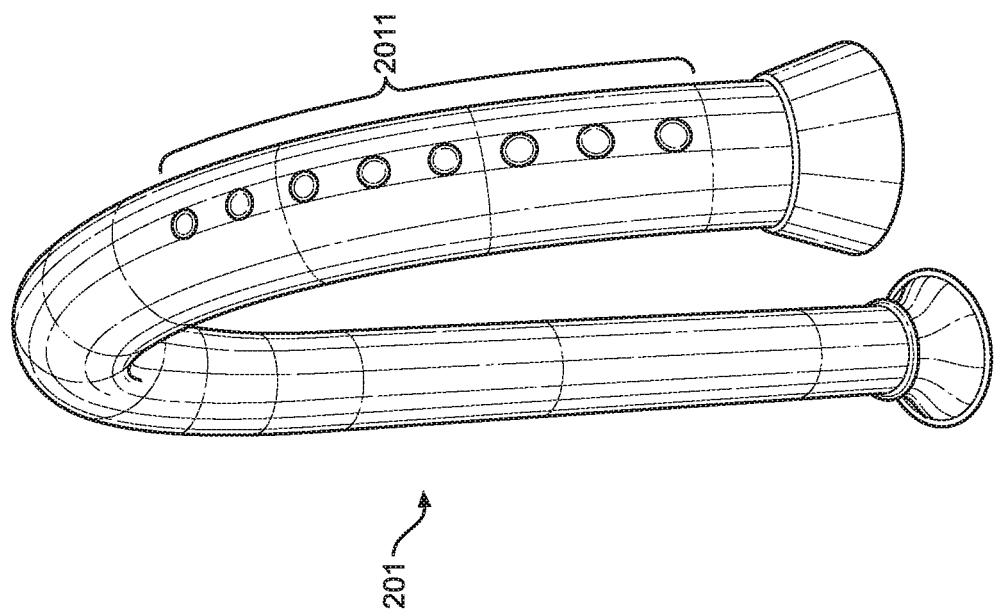
FIG. 3 shows a perspective view of an embodiment of a faucet with a plurality of timing lights disposed thereon.

Referring now to FIG. 3, there is shown a perspective view of an embodiment of a faucet with a plurality of timing lights disposed, thereon. In one embodiment, the timing lights 2011 are located along the top of the faucet 201. In one embodiment, there are a plurality of lights. In one embodiment, the timing lights 2011 are LED lights. In one embodiment, the timing lights 2011 can be set to change colors. In this embodiment the light colors can be controlled by the mobile application. In one embodiment the timing lights 2011 can be a predetermined color.

In one embodiment, the timing lights 2011 can be programed to illuminate as the timer counts down to the faucet 201 turning off. In some embodiments the timing lights 2011 can go from green, the most amount of time left, to red, the least amount of time left. In one embodiment, the timing lights 2011 can illuminate as more time has gone by of the faucet 201 running. The timing lights 2011 can allow a user to know when the faucet will turn off.

Figure 4:
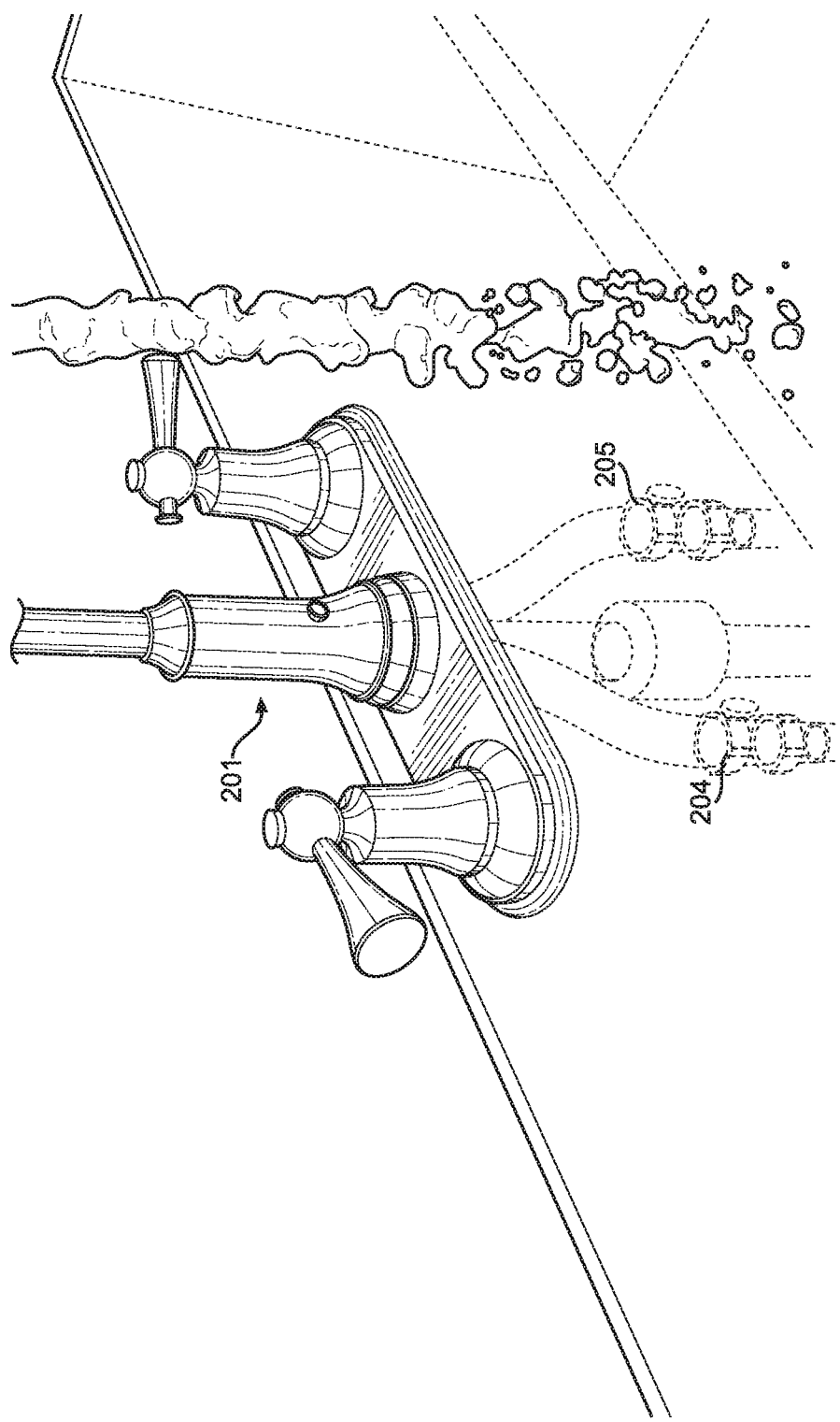
FIG. 4 shows a perspective view of an embodiment of the faucet control system with two different valves.

Referring now to FIG. 4, there is shown a perspective view of an embodiment of the faucet control system with two different valves. In one embodiment there are two different valves for controlling the faucet 201. A first valve 204 controls the water flow like a normal valve. The first valve 204 can be turned to flow by moving the handle just like a traditional faucet. The first valve 204 can remain open, even if water is cut off from flow.

The second valve 205 is an electric valve. The second valve 205 can be electrically turned from open to closed. The second valve 205 further has a pressure sensor held, therein. The pressure sensor detects when water is flowing. In other embodiments, a different sensor is used to detect the flow of water. The second valve can detect when water is no longer flowing and rest the timer opening the valve when pressure decreases. The second valve 205 is in electrical communication with the mobile application and can be controlled via the mobile application.

Figure 5A:
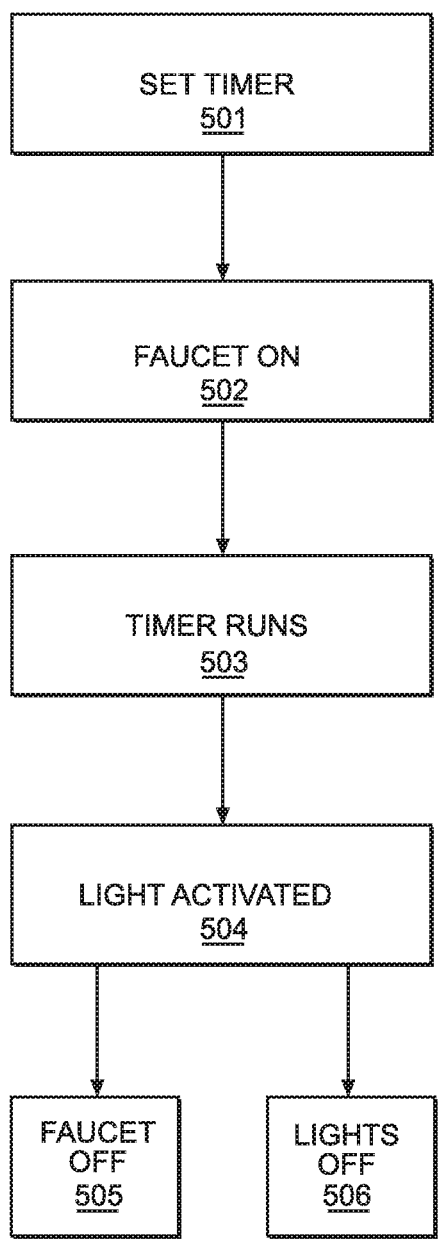
FIG. 5A shows a flow chart of an embodiment of the faucet control system, wherein the water is turned off after a specified amount of time.

Referring now to FIG. 5A, there is shown a flow chart of an embodiment of the faucet control system, wherein the water is turned off after a specified amount of time. The user can set a timer on the mobile application 501. The user can then turn the faucet on 502. The timer will begin to run 503. When the timer begins to run the timing lights will be activated. More timing lights will be activated as the timer counts down. After the timer expires, the faucet and the lights will turn off 505, 506.

Figure 5B:
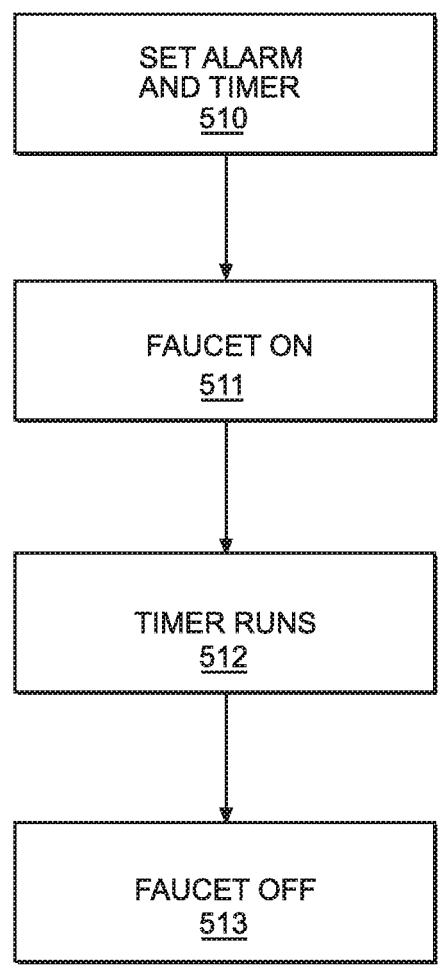
FIG. 5B shows a flow chart of an embodiment of the faucet control system turning the water on at a specified time and turning the water off after a specified amount of time.

Referring now to FIG. 5B, there is shown a flow chart of an embodiment of the faucet control system turning the water on at a specified time, and turning the water off after a specified amount of time. The method starts by setting an alarm and a timer on the mobile application 510. Turning on the first valve of the faucet, and ensuring the water is not running. The mobile application will turn the second valve to open allowing water to flow through the faucet 511. The timer will begin the run 512. Once the timer expires, the faucet will turn off 513.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A faucet control system, comprising:
   a faucet with a first valve and a second valve;
   the first valve is a manually controlled valve;
   the second valve is an automated valve, wherein the valve is activated for a specific time;
   the second valve independently operable from the first valve;
   wherein the second valve includes a pressure sensor to detect water flow;
   a timer is started for the specific time when water flow is detected;
   the faucet in operable connection with a wireless transmitter;
   an application on a mobile device is operably connected to the wireless transmitter to specify the specific time of water flow and to control the faucet;
   a plurality of timing lights disposed along the top of the faucet, wherein the timing lights are configured to illuminate as the timer counts down to the faucet turning off.

2. The faucet control system of claim 1 wherein, the application configures the faucet to turn off after a specified amount of time.

3. The faucet control system of claim 1 wherein, the application configures the faucet to turn on at a specified time.

4. The faucet control system of claim 3 wherein, the application configures the faucet to turn off after water has been running for a specified amount of time.

5. The faucet control system of claim 1, further comprising:
   a set of lights on the faucet to determine how much time until the water turns off.

6. The faucet control system of claim 1, further comprising a connection light, wherein the connection light is disposed on a front face of the faucet.

7. The faucet control system of claim 1, wherein the first valve is independently operable from the second valve.

8. A method for controlling a faucet, the method comprising:

setting a timer on a mobile application;
turning on a faucet;
the faucet having a first valve and a second valve;
wherein the first valve is a manual valve;
wherein the second valve is an automated valve;
the second valve being operable independently of the first valve;
detecting the flow of water via a pressure sensor connected to the second valve of the faucet;
activating a plurality of timing lights;
starting the count-down of the timer;
turning the faucet off once the timer expires.

9. The method for controlling a faucet of claim 8, further comprising: setting a timer, wherein the timer will turn the faucet on.

10. The method for controlling a faucet of claim 8, further comprising: activating additional lights as the timer runs once the faucet is turned on.

11. The method for controlling a faucet of claim 8, wherein the first valve is independently operable from the second valve.

\* \* \* \* \*